United States Patent
Kidambi et al.

(10) Patent No.: US 8,713,907 B2
(45) Date of Patent: May 6, 2014

(54) SYSTEM FOR PROVIDING AIR FLOW TO A SULFUR RECOVERY UNIT

(75) Inventors: Ganesh Prasadh Kidambi, Gudalur-Nilgiris (IN); Sachin Suhas Naphad, Katy, TX (US); Asiff Apdul Supahan, Bangalore (IN)

(73) Assignee: General Electric Company, Schenectady, NY (US)

( * ) Notice: Subject to any disclaimer, the term of this patent is extended or adjusted under 35 U.S.C. 154(b) by 1159 days.

(21) Appl. No.: 12/652,021

(22) Filed: Jan. 4, 2010

(65) Prior Publication Data

US 2011/0162385 A1 Jul. 7, 2011

(51) Int. Cl.
*F02C 3/20* (2006.01)
*B01D 50/00* (2006.01)
*B01D 59/50* (2006.01)

(52) U.S. Cl.
USPC .......................... 60/39.461; 55/315

(58) Field of Classification Search
USPC ......... 60/34.461, 39.465, 39.464, 39.52, 781, 60/782, 785, 784, 801; 55/315; 95/232, 95/47, 54, 130, 138; 96/4
See application file for complete search history.

(56) References Cited

U.S. PATENT DOCUMENTS

| | | | | |
|---|---|---|---|---|
| 4,306,411 A * | 12/1981 | Zoll | | 60/39.464 |
| 4,632,818 A * | 12/1986 | Chen et al. | | 423/574.1 |
| 4,918,915 A * | 4/1990 | Pfefferle | | 60/781 |
| 4,957,515 A * | 9/1990 | Hegarty | | 95/162 |
| 5,863,513 A * | 1/1999 | Rathbone | | 423/573.1 |
| 6,957,539 B2 * | 10/2005 | Lebas et al. | | 60/772 |
| 7,290,403 B2 | 11/2007 | Peyron | | |
| 7,947,115 B2 * | 5/2011 | Sullivan | | 95/54 |
| 2007/0181854 A1* | 8/2007 | Briesch et al. | | 252/373 |
| 2007/0204625 A1* | 9/2007 | Thatcher et al. | | 60/782 |

FOREIGN PATENT DOCUMENTS

WO 02101216 12/2002

\* cited by examiner

*Primary Examiner* — Gerald L Sung
*Assistant Examiner* — William Breazeal
(74) *Attorney, Agent, or Firm* — Fletcher Yoder P.C.

(57) ABSTRACT

A system includes a sulfur recovery unit including a thermal reactor having an acid gas inlet and an air inlet. The acid gas inlet is configured to receive a flow of acid gas, and the air inlet is configured to receive an air flow of pressurized air extracted from a gas turbine compressor of a gas turbine engine.

19 Claims, 3 Drawing Sheets

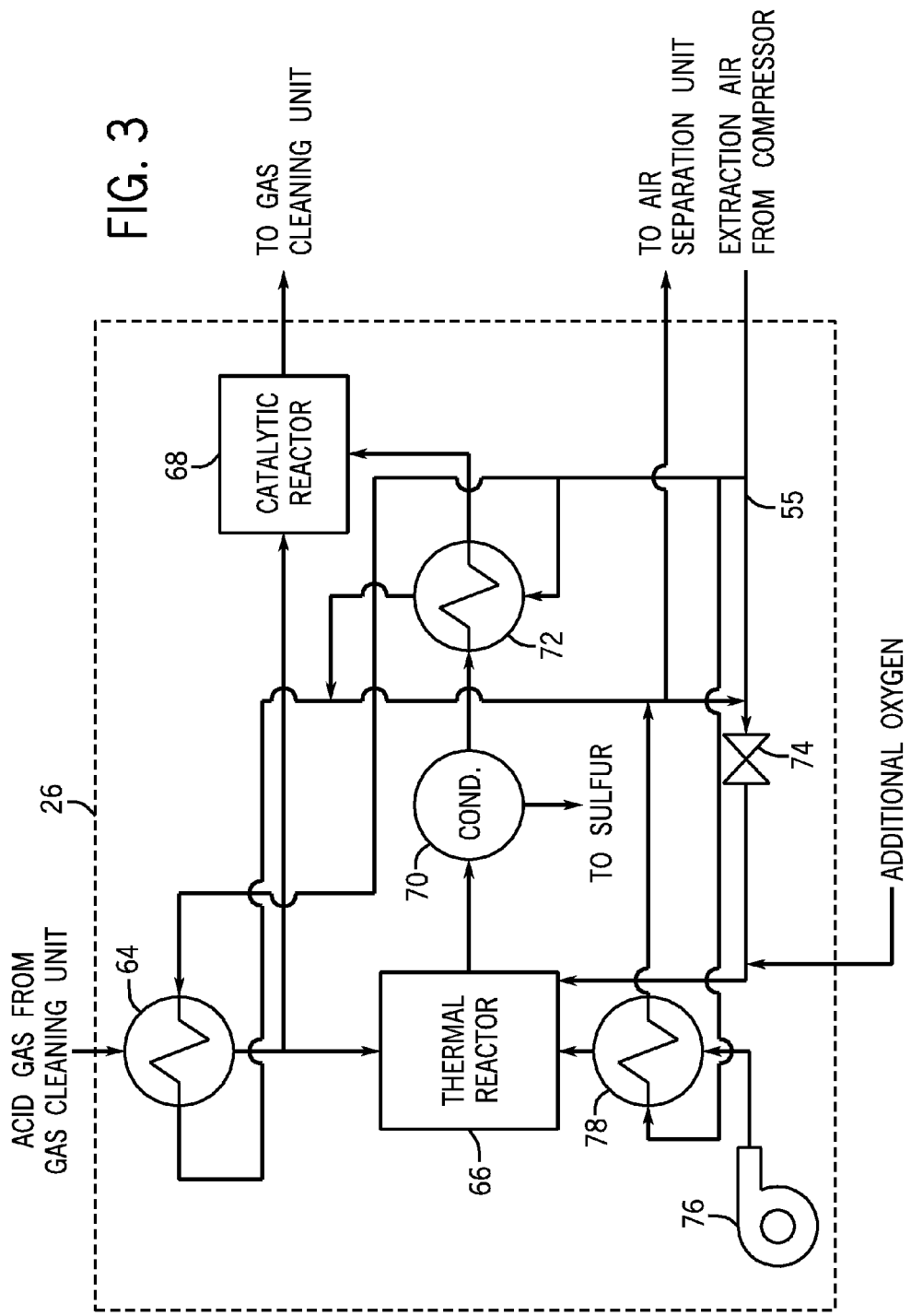

SYSTEM FOR PROVIDING AIR FLOW TO A SULFUR RECOVERY UNIT

BACKGROUND OF THE INVENTION

The subject matter disclosed herein relates to a system for providing air flow to a sulfur recovery unit.

Fossil fuels, such as coal or petroleum, may be gasified for use in the production of electricity, chemicals, synthetic fuels, or for a variety of other applications. Gasification involves the incomplete combustion of a carbonaceous fuel with limited oxygen at a very high temperature to produce syngas, a fuel containing carbon monoxide and hydrogen, which enables higher efficiency and cleaner emissions than the fuel in its original state.

The gasification process may result in syngas containing undesirable levels of sulfur or other contaminants. A gas cleaning unit may serve to remove a portion of such contaminants prior to combustion of the syngas. For example, the gas cleaning unit may remove sulfur from the syngas in the form of acid gas containing hydrogen sulfide ($H_2S$). The acid gas may be routed to a sulfur recovery unit (SRU) configured to convert the $H_2S$ into elemental sulfur. The conversion process may involve reacting the $H_2S$ with large quantities of heated and pressurized air within a thermal reactor. Unfortunately, generating the heated and pressurized air flow may utilize large quantities of energy, thereby decreasing the efficiency of the gasification process.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gas turbine compressor configured to provide a flow of pressurized air to a combustor. The system further includes a sulfur recovery unit including a thermal reactor, and an extraction air line extending between the gas turbine compressor and the sulfur recovery unit. The extraction air line routes a portion of the pressurized air from the gas turbine compressor to the thermal reactor.

In a second embodiment, a sulfur recovery unit including a thermal reactor having an acid gas inlet and an air inlet. The acid gas inlet is configured to receive a flow of acid gas, and the air inlet is configured to receive an air flow of pressurized air extracted from a gas turbine compressor of a gas turbine engine.

In a third embodiment, a system includes a gas turbine engine including a gas turbine compressor. The system also includes an air separation unit configured to receive pressurized air extracted from the gas turbine compressor via a conduit extending between the gas turbine compressor and the air separation unit. The system further includes a sulfur recovery unit configured to extract a portion of the pressurized air from the conduit.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3 is a block diagram of an alternative embodiment of the SRU, as shown in FIG. 1, in which air extracted from the gas turbine compressor is utilized to heat air from a blower prior to injection into the thermal reactor in accordance with certain embodiments of the present technique.

DETAILED DESCRIPTION OF THE INVENTION

Figure 1:
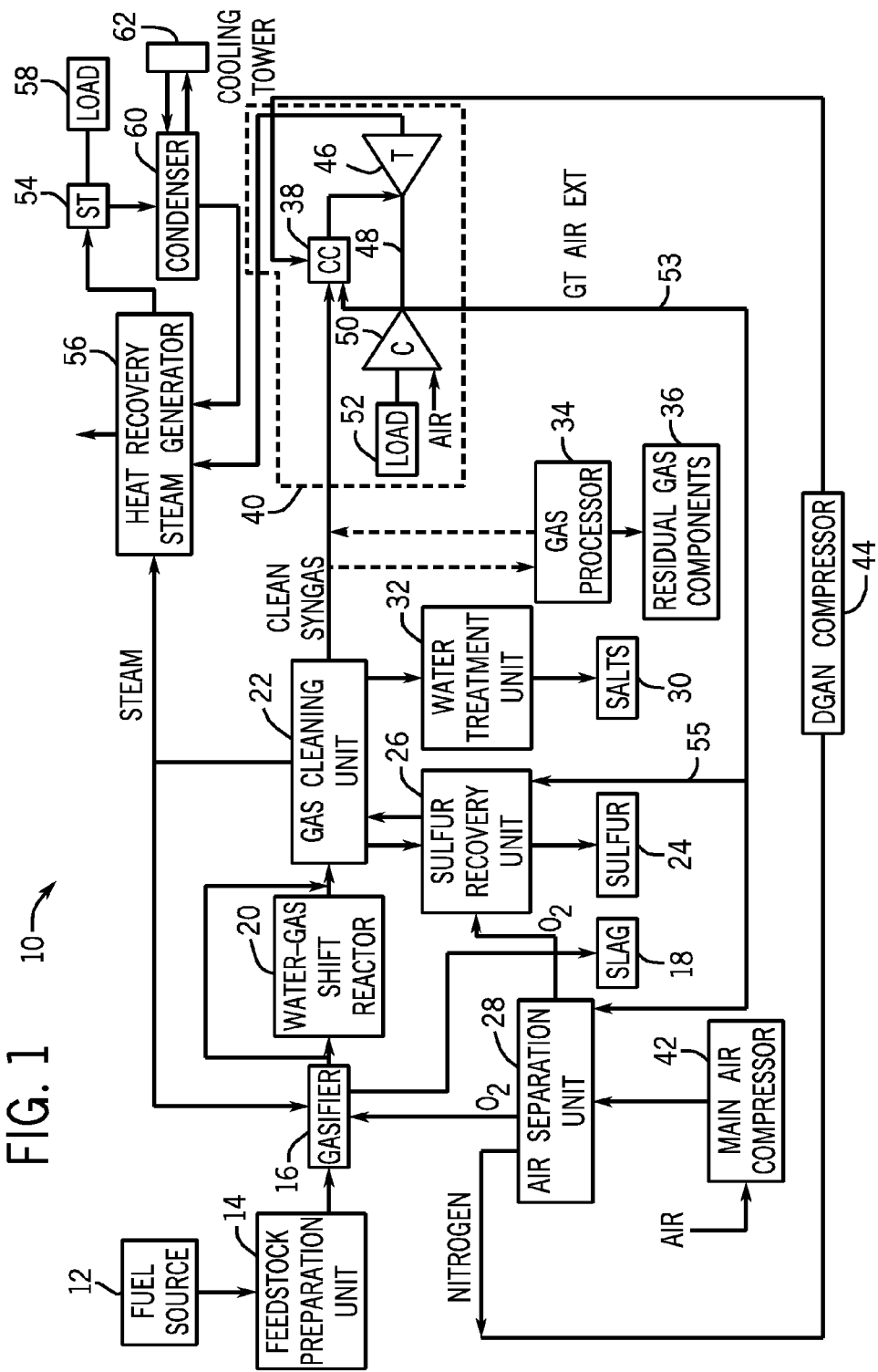
FIG. 1 is a block diagram of an integrated gasification combined cycle (IGCC) power plant in which air extracted from a gas turbine compressor is routed to a sulfur recovery unit (SRU) in accordance with certain embodiments of the present technique.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure may increase the efficiency of a gasification process by providing air extracted from a gas turbine compressor to a thermal reactor of a sulfur recovery unit (SRU). Certain SRUs include blowers and a heat exchanger configured to provide the thermal reactor with a flow of heated and pressurized air. Operation of the blowers utilizes electrical energy which decreases the efficiency of the gasification process. Furthermore, the heat exchanger may be configured to transfer heat from a steam source to the air provided by the blowers before the air enters the thermal reactor. As will be appreciated, transferring heat to the blower air decreases the temperature of the steam. Therefore, the steam contains less energy that may be utilized for other operations within a power generation plant, such as driving a steam turbine. Consequently, the efficiency of the gasification and/or power generation processes may be further reduced.

The present embodiments are configured to obviate the steam-to-air heat exchanger, and reduce the number of blowers providing air to the thermal reactor. Specifically, certain power generation plants include a gas turbine engine, including a gas turbine compressor configured to provide a flow of pressurized air to a combustor. In the present embodiments, a portion of the pressurized air is extracted from the gas turbine compressor and is provided to the thermal reactor of the SRU. In this manner, the number of blowers may be reduced as compared to configurations in which air flow is only provided by the blowers. Consequently, the efficiency of the gasification process may be increased due to the reduction in blower power consumption. Furthermore, the reduction in the number of blowers may decrease maintenance costs and reduce the space utilized by the SRU.

In addition, the steam-to-air heat exchanger may be omitted because the air flow provided by the gas turbine compressor has been heated by the compressor process. Consequently, the efficiency of the gasification process may be enhanced because the heated air may obviate the heat exchanger. Specifically, without the steam-to-air heat exchanger, the temperature of the steam may be maintained, thereby increasing the energy content of the steam. As will be appreciated, because the steam may be utilized to drive a steam turbine for energy generation, increasing the energy content of the steam results in greater steam turbine power output. Furthermore, omission of the heat exchanger may decrease maintenance costs and reduce space utilized by the SRU due to the reduction in SRU components.

FIG. 1 is a schematic block diagram showing an embodiment of a power generation plant 10. The illustrated power generation plant 10 may be an integrated gasification combined cycle (IGCC) system 10 that may produce and burn a synthetic gas, i.e., syngas. Elements of the IGCC system 10 may include a fuel source 12, such as a solid feed, that may be utilized as a source of energy for the IGCC system 10. The fuel source 12 may include coal, petroleum coke, biomass, wood-based materials, agricultural wastes, tars, coke oven gas, and asphalt, or other carbon containing items.

The solid fuel of the fuel source 12 may be passed to a feedstock preparation unit 14. The feedstock preparation unit 14 may, for example, resize or reshaped the fuel source 12 by chopping, milling, shredding, pulverizing, briquetting, or palletizing the fuel source 12 to generate feedstock. Additionally, water, or other suitable liquids may be added to the fuel source 12 in the feedstock preparation unit 14 to create slurry feedstock. In other embodiments, no liquid is added to the fuel source, thus yielding dry feedstock.

The feedstock prepared by the feedstock preparation unit 14 may be passed to a gasifier 16. The gasifier 16 may convert the feedstock into syngas, e.g., a combination of carbon monoxide and hydrogen. This conversion may be accomplished by subjecting the feedstock to a controlled amount of any moderator and oxygen at elevated pressures (e.g., from approximately 600 PSIG-1200 PSIG) and temperatures (e.g., approximately 2200° F.-2700° F.), depending on the type of gasifier utilized. The heating of the feedstock during a pyrolysis process may generate a solid (e.g., char) and residue gases (e.g., carbon monoxide, hydrogen, and nitrogen). The char remaining from the feedstock from the pyrolysis process may only weigh up to approximately 30% of the weight of the original feedstock.

The combustion reaction in the gasifier 16 may include introducing oxygen to the char and residue gases. The char and residue gases may react with the oxygen to form carbon dioxide and carbon monoxide, which provides heat for the subsequent gasification reactions. The temperatures during the combustion process may range from approximately 2200° F. to approximately 2700° F. In addition, steam may be introduced into the gasifier 16. The gasifier 16 utilizes steam and limited oxygen to allow some of the feedstock to be burned to produce carbon monoxide and energy, which may drive a second reaction that converts further feedstock to hydrogen and additional carbon dioxide.

In this way, a resultant gas may be manufactured by the gasifier 16. The resultant gas may include approximately 85% of carbon monoxide and hydrogen, as well as $CH_4$, HCl, HF, COS, $NH_3$, HCN, and $H_2S$ (based on the sulfur content of the feedstock). This resultant gas may be termed "raw syngas." The gasifier 16 may also generate waste, such as a slag 18, which may be a wet ash material.

In certain embodiments (e.g., carbon capture cases), the dirty syngas may be passed on to a water-gas shift (WGS) reactor 20 to obtain a high hydrogen yield. The WGS reactor 20 may perform a water-gas shift reaction in which carbon monoxide reacts with water, (e.g., steam), to form carbon dioxide and hydrogen. This process may adjust the ratio of hydrogen to carbon monoxide in the raw syngas from approximately 1 to 1 to approximately 3 to 1, based on a desired level of carbon capture, for further gas processing. It should be noted that the WGS reactor 20 may be a sour WGS reactor, that is, sulfur may be present in the raw syngas fed into the WGS reactor 20 during the water-gas shift reaction.

A gas cleaning unit 22 may be utilized to clean the raw syngas. The gas cleaning unit 22 may scrub the raw syngas to remove the HCl, HF, COS, HCN, and $H_2S$ from the raw syngas, which may include the separation of $H_2S$ by an acid gas removal process. Elemental sulfur 24 may by recovered by a sulfur recovery unit 26 from the $H_2S$. Furthermore, the gas cleaning unit 22 may separate salts 30 from the raw syngas via a water treatment unit 32, which may utilize water purification techniques to generate usable salts 30 from the raw syngas. Subsequently, a clean syngas may be generated from the gas cleaning unit 22.

A gas processor 34 may be utilized to remove residual gas components 36 from the clean syngas, such as ammonia and methane, as well as methanol or other residual chemicals. However, removal of residual gas components 36 from the clean syngas is optional since the clean syngas may be utilized as a fuel even when containing the residual gas components 36 (e.g., tail gas). At this point, the clean syngas may include approximately 3%-40% CO, approximately up to 60% $H_2$, and approximately 10%-40% $CO_2$, and may be substantially stripped of $H_2S$. This clean syngas may be directed into a combustor 38 (e.g., a combustion chamber) of a gas turbine engine 40 as combustible fuel.

The IGCC system 10 may include an air separation unit (ASU) 28 to separate air into component gases using, for example, cryogenic distillation techniques. The ASU 28 may separate oxygen from the air supplied to it from a main air compressor (MAC) 42 and may transfer the separated oxygen to the gasifier 16. Additionally, the ASU 28 may direct separated nitrogen to a diluent nitrogen (DGAN) compressor 44. The DGAN compressor 44 may compress the nitrogen received from the ASU 28 at least to pressure levels equal to those in the combustor 38, enabling injection into the combustion chamber. Thus, once the DGAN compressor 44 has adequately compressed the nitrogen to an adequate level, the DGAN compressor 44 may direct the compressed nitrogen to the combustor 38 of the gas turbine engine 40.

As described above, the compressed nitrogen may be transferred from the DGAN compressor 44 to the combustor 38 of the gas turbine engine 40. The gas turbine engine 40 may include a turbine 46, a drive shaft 48, and a compressor 50, as well as the combustor 38. The combustor 38 may receive fuel, such as the syngas, which may be injected under pressure from fuel nozzles. This fuel may be mixed with compressed air as well as compressed nitrogen from the DGAN compressor 44 and combusted within the combustor 38. This combustion may create hot pressurized exhaust gases.

The combustor 38 may direct the exhaust gases towards an exhaust outlet of the turbine 46. As the exhaust gases from the combustor 38 pass through the turbine 46, the exhaust gases may force turbine blades in the turbine 46 to rotate the drive shaft 48 along an axis of the gas turbine engine 40. As illustrated, the drive shaft 48 may be connected to various components of the gas turbine engine 40, including the compressor 50.

The drive shaft 48 may connect the turbine 46 to the compressor 50 to form a rotor. The compressor 50 may include blades coupled to the drive shaft 48. Thus, rotation of turbine blades in the turbine 46 may cause the drive shaft 48 connecting the turbine 46 to the compressor 50 to rotate blades within the compressor 50. The rotation of blades in the compressor 50 causes the compressor 50 to compress air received via an air intake in the compressor 50. The compressed air may then be fed to the combustor 38 and mixed with fuel and compressed nitrogen to allow for higher efficiency combustion. The drive shaft 48 may also be connected to a load 52, which may be a stationary load, such as an electrical generator, for producing electrical power in a power plant. Indeed, the load 52 may be any suitable device that is powered by the rotational output of the gas turbine engine 40.

In the present embodiment, the gas turbine compressor 50 also provides a flow of air to the ASU 28 to supplement the MAC 42. Specifically, air may be extracted from the last stage of the compressor 50 and routed to the ASU 28 via an extraction air line or conduit 53. In certain configurations, approximately 5 to 50, 10 to 40, 10 to 35, or about 10 to 30 percent of the total air flow from the gas turbine compressor 50 may be extracted for use in the ASU 28. Furthermore, a portion of the air flow from the compressor 50 to the ASU 28 may be routed to the SRU 26 via a conduit 55. In certain embodiments, approximately between 2 to 13, 3 to 12, 4 to 11, or about 5 to 10 mole percent of the air flow through the compressor-to-ASU conduit 53 may be routed through the conduit 55 to the SRU 26. In alternative configurations, a separate conduit may route the air flow directly from the compressor 50 to the SRU 26.

As discussed in detail below, the SRU 26 is configured to react acid gas with oxygen in a thermal reactor to form elemental sulfur 24. In the present configuration, at least a portion of the oxygen may be provided by the air flow extracted from the gas turbine compressor 50. Such a configuration may increase the efficiency of the IGCC system 10 compared to embodiments in which the oxygen is supplied by blowers. Specifically, because blowers utilize energy to provide an air flow to the thermal reactor, reducing the number of blowers may increase the total energy output of the IGCC system 10. Furthermore, air from the blowers may be heated within a steam-to-air heat exchanger prior to entering the thermal reactor. Because the air extracted from the gas turbine compressor 50 has already been heated by the compressor process, the heat exchanger may be omitted. Consequently, the energy content of the steam may be maintained, thereby further increasing the IGCC system efficiency. Moreover, reducing the number of blowers and/or omitting the heat exchanger may decrease the space utilized by the SRU 26 and/or reduce maintenance costs.

The IGCC system 10 also may include a steam turbine engine 54 and a heat recovery steam generation (HRSG) system 56. The steam turbine engine 54 may drive a second load 58, such as an electrical generator for generating electrical power. However, both the first and second loads 52 and 58 may be other types of loads capable of being driven by the gas turbine engine 40 and the steam turbine engine 54, respectively. In addition, although the gas turbine engine 40 and the steam turbine engine 54 may drive separate loads 52 and 58, as shown in the illustrated embodiment, the gas turbine engine 40 and the steam turbine engine 54 may also be utilized in tandem to drive a single load via a single shaft. The specific configuration of the steam turbine engine 54, as well as the gas turbine engine 40, may be implementation-specific and may include any combination of sections.

Heated exhaust gas from the gas turbine engine 40 may be directed into the HRSG 56 and used to heat water and produce steam used to power the steam turbine engine 54. Exhaust from the steam turbine engine 54 may be directed into a condenser 60. The condenser 60 may utilize a cooling tower 62 to completely condense steam from the steam turbine discharge. In particular, the cooling tower 62 may provide cool water to the condenser 60 to aid in condensing the steam directed into the condenser 60 from the steam turbine engine 54. Condensate from the condenser 60 may, in turn, be directed into the HRSG 56. Again, exhaust from the gas turbine engine 40 may also be directed into the HRSG 56 to heat the water from the condenser 60 and produce steam.

As such, in combined cycle systems such as the IGCC system 10, hot exhaust may flow from the gas turbine engine 40 to the HRSG 56, where it may be used to generate high-pressure, high-temperature steam. The steam produced by the HRSG 56 may then be passed through the steam turbine engine 54 for power generation.

Figure 2:
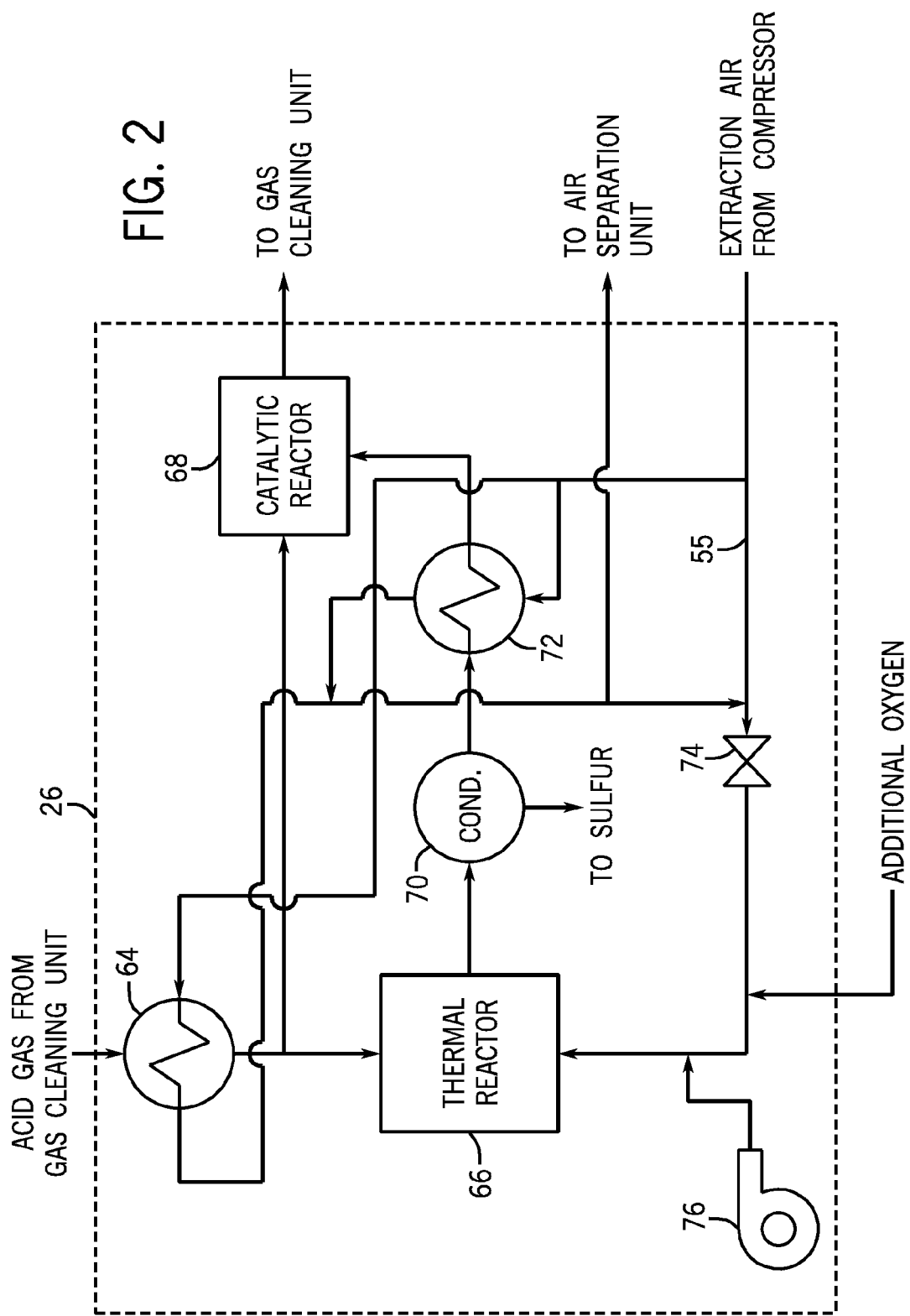
FIG. 2 is a block diagram of a first embodiment of the SRU, as shown in FIG. 1, in which air extracted from the gas turbine compressor is mixed with air from a blower prior to injection into a thermal reactor in accordance with certain embodiments of the present technique.

FIG. 2 is a block diagram of a first embodiment of the SRU 26, as shown in FIG. 1, in which air extracted from the gas turbine compressor 50 is mixed with air from a blower prior to injection into the thermal reactor. As illustrated, acid gas from the gas cleaning unit 22 first enters a heat exchanger 64. The heat exchanger 64 is configured to increase a temperature of the acid gas prior to the acid gas flowing into a thermal reactor 66 and/or a catalytic reactor 68. As will be appreciated, increasing the acid gas temperature may facilitate enhanced chemical reactions within the thermal reactor 66 and/or the catalytic reactor 68. In the present embodiment, a portion of the air extracted from the gas turbine compressor 50 and routed to the SRU 26 is provided to the heat exchanger 64. The heat exchanger 64, in turn, transfers heat from the extraction air to the acid gas flowing into the thermal reactor 66 and/or the catalytic reactor 68. For example, air extracted from the gas turbine compressor 50 may be approximately between 300 to 1200, 400 to 1000, or about 500 to 800 degrees Fahrenheit. Consequently, the heat exchanger 64 may be configured to transfer a desired quantity of the heat from the extraction air to the acid gas to properly regulate the reactions within the thermal reactor 66 and/or the catalytic reactor 68. Such a configuration may increase efficiency of the IGCC system 10 compared to embodiments in which steam is utilized to heat the acid gas. Specifically, by heating the acid gas with extraction air instead of steam, the energy content of the steam may be maintained for driving the steam turbine 54, thereby increasing the total power output of the system 10.

As illustrated, the acid gas flows from the heat exchanger 64 to an acid gas inlet of the thermal reactor 66. In the present embodiment, the thermal reactor 66 converts the acid gas into elemental sulfur by a Claus process. In the Claus process, hydrogen sulfide ($H_2S$) within the acid gas reacts with oxygen in the thermal reactor 66 to produce sulfur dioxide ($SO_2$). The $SO_2$ then reacts with residual $H_2S$ to produce elemental sulfur and water ($H_2O$). In this manner, $H_2S$ is removed from the acid gas, and the elemental sulfur is collected. Specifically, exhaust gas from the thermal reactor 66, including elemental sulfur and residual $H_2S$ and $SO_2$, flows into a condenser 70 in which the elemental sulfur within the exhaust gas is condensed and routed to the sulfur storage container 24. The remaining exhaust gas flows into a reheater 72, in which a temperature of the exhaust gas is increased prior to flowing into the catalytic reactor 68. In the present embodiment, a portion of the air extracted from the gas turbine compressor 50 and routed to the SRU 26 is provided to the reheater 72. The reheater 72, in turn, transfers heat from the extraction air to the exhaust gas from the thermal reactor 66. For example, air extracted from the gas turbine compressor 50 may be approximately between 300 to 1200, 400 to 1000, or about 500 to 800 degrees Fahrenheit. Consequently, the reheater 72 may be configured to transfer a desired quantity of the heat from the extraction air to the exhaust gas to properly regulate the reaction within the catalytic reactor 68. Such a configuration may increase efficiency of the IGCC compared to embodiments in which steam is utilized to reheat the thermal reactor exhaust gas. Specifically, by heating the exhaust gas with extraction air instead of steam, the energy content of the steam may be maintained for driving the steam turbine 54, thereby increasing the total power output of the system 10.

As previously discussed, the exhaust gas includes residual $H_2S$ and $SO_2$ that may be removed by the catalytic reactor 68 before the gas is returned to the gas cleaning unit 22. As will be appreciated, the catalytic reactor 68 may contain a catalyst, such as aluminum oxide and/or titanium dioxide, configured to induce the residual $H_2S$ and $SO_2$ to react and produce elemental sulfur and water. Consequently, the quantity of $H_2S$ within the acid gas may be substantially reduced by the catalytic reactor 68 alone, or in combination with the thermal reactor 66.

As illustrated, the extraction air flows in parallel to the heat exchanger 64 and the reheater 72. Specifically, a portion of the air extracted from the gas turbine compressor 50 is split between the reheater 72 and the heat exchanger 64. As will be appreciated, the ratio of reheater air flow to heat exchanger air flow may be particularly selected and/or variable based on desired heat flow to the acid gas and the thermal reactor exhaust gas. Furthermore, after the extraction air has passed through the reheater 72 and the heat exchanger 64, the air is directed back to the conduit 55. As will be appreciated, the overall temperature of the air within the conduit 55 will be reduced due to heat loss from the reheater 72 and the heat exchanger 64.

In the present embodiment, the SRU 26 includes an expansion device, such as the illustrated expansion valve 74. The expansion valve 74 is configured to decrease the pressure of the air provided by the gas turbine compressor 50. For example, air upstream of the expansion valve 74 may be approximately between 100 to 600, 125 to 500, 150 to 400, or about 175 to 300 psi. The expansion valve 74 is configured to reduce the pressure of the airflow to a pressure suitable for use in the thermal reactor 66. For example, in certain configurations, the pressure of the airflow may be reduced to approximately between 5 to 200, 10 to 150, 15 to 125, 20 to 100, or about 25 to 75 psi. As will be appreciated, decreasing the pressure of the airflow also decreases the temperature of the airflow. For example, as previously discussed, the air upstream of the expansion valve 74 may be approximately between 300 to 1200, 400 to 1000, or about 500 to 800 degrees Fahrenheit. The pressure decrease caused by the expansion valve 74 may induce the air temperature to decrease to approximately between 100 to 1000, 200 to 900, or about 300 to 800 degrees Fahrenheit. However, as discussed in detail below, the temperature of the air flow is sufficient to obviate a separate heat exchanger for increasing the temperature of the air flowing into the thermal reactor 66.

In the present embodiment, the air flow from the gas turbine compressor 50 is mixed with additional oxygen sources before flowing into an air inlet of the thermal reactor 66. Specifically, the air flow may be mixed with a supply of oxygen from the ASU 28. As previously discussed, the ASU 28 is configured to separate air into nitrogen and oxygen. A fraction of the oxygen may be routed to the SRU 26 and mixed with the extraction air downstream from the expansion valve 74 to increase the oxygen content of the air supplied to the thermal reactor 66. Furthermore, additional air may be provided by one or more blowers 76. As will be appreciated, the quantity of air supplied to the thermal reactor 66 may be a function of the quantity of acid gas injected into the thermal reactor 66. Specifically, a sufficient quantity of air may be provided to the thermal reactor 66 to properly react the $H_2S$ in the Claus process. For example, during periods when large quantities of acid gas are being injected into the thermal reactor 66, additional air may be supplied. The blowers 76 may be configured to vary an air flow rate to properly supply the thermal reactor 66 with a sufficient quantity of air to maintain a proper reaction within the thermal reactor 66. For example, during startup periods, the air supplied by the gas turbine compressor 50 may be insufficient to properly react the acid gas within the thermal reactor 66. Consequently, air flow from the blowers 76 may be increased to compensate.

However, during normal operation, providing extraction air to the thermal reactor 66 may substantially reduce or eliminate air flow from the blowers 76, thereby decreasing the energy utilized by the SRU 26. As will be appreciated, decreasing air flow to the ASU 28 by routing a portion of the extraction air to the SRU 26 may increase the load on the MAC 42. However, because the MAC 42 may be more efficient to operate than the blowers 76, the present embodiment may decrease overall energy utilization compared to embodiments that only supply air flow to the thermal reactor 66 via the blowers 76. Furthermore, because a portion of the air flow is provided by air extracted from the gas turbine compressor 50, the number of blowers 76 may be reduced. For example, embodiments that provide air to the thermal reactor 66 via blowers 76 alone may utilize 3 to 8, 3 to 6, or about 4 blowers 76. The present embodiment may reduce the number of blowers 76 to two or less. The reduction in number of blowers 76 may decrease maintenance costs and reduce the space utilized by the SRU 26.

As will be appreciated, the temperature of the air provided to the thermal reactor 66 may be a function of $H_2S$ concentration within the acid gas. For example, the acid gas may contain approximately 20% to 50%, 25% to 45%, 30% to 40%, or about 35% $H_2S$. For example, if the $H_2S$ concentration is approximately 35%, the temperature of incoming air may be approximately 300 to 450 degrees Fahrenheit to properly react the acid gas and air within the thermal reactor 66. Consequently, embodiments that employ blowers 76 alone may utilize a steam-to-air heat exchanger to increase the temperature of air provided to the thermal reactor 66. In contrast, the illustrated embodiment mixes air from the blowers 76 with the hot pressurized air from the gas turbine compressor 50. As will be appreciated, during the mixing process, heat from the extraction air is transferred to the blower air, thereby increasing the temperature of the mixture to a level suitable for use in the thermal reactor 66. Consequently, the heat exchanger employed in embodiments that provide air from blowers 76 alone may be obviated. As a result, the utilized space and maintenance costs associated with the SRU 26 may be reduced compared to embodiments including the extra heat exchanger. Furthermore, because steam is not utilized to heat the air flow within the heat exchanger, the energy content of the steam may be maintained for driving the steam turbine 54, thereby increasing the total power output of the system 10. In addition, the temperature of the mixed air flow may be greater than air temperatures provided by the steamto-air heat exchanger. Consequently, the higher temperatures may facilitate increased flame stability within the thermal reactor 66.

FIG. 3 is a block diagram of an alternative embodiment of the SRU 26 in which air extracted from the gas turbine compressor 50 is utilized to heat air from the blowers 76 prior to injection into the thermal reactor 66. Specifically, the illustrated embodiment includes a second heat exchanger 78 configured to transfer heat from the extraction air to the air provided by the blowers 76. As illustrated, the air extracted from the gas turbine compressor 50 mixes with additional oxygen downstream from the expansion valve 74, and the mixture flows into the thermal reactor 66. Air from the blowers 76 is directed through the heat exchanger 78 before entering the thermal reactor 66. In this configuration, the air from the blowers 76 does not mix with the extraction air prior to entering the thermal reactor 66. Similar to the first embodiment, the extraction air flows in parallel to the heat exchangers 64 and 78, and the reheater 72. Specifically, a portion of the air extracted from the gas turbine compressor 50 is directed to each heat exchanger 64 and 78, and the reheater 72 via separate flow passages. As illustrated, the air for the heat exchangers 64 and 78, and the reheater 72, is extracted upstream of the expansion valve 74. After flowing through the heat exchangers 64 and 78, and the reheater 72, the air is returned to the conduit 55 before entering the expansion valve 74.

The present configuration may increase efficiency of the IGCC system 10 compared to embodiments that employ a heat exchanger configured to transfer heat from steam to the air provided by the blowers 76. Specifically, without the steam-to-air heat exchanger, the temperature of the steam will not be reduced, thereby increasing the energy content of the steam. As will be appreciated, because the steam may be utilized to drive the steam turbine 54, increasing the energy content of the steam results in greater steam turbine power output. Furthermore, as previously discussed, utilizing air extracted from the gas turbine compressor 50 as an oxygen source within the thermal reactor 66 substantially reduces or eliminates the load on the blowers 76, thereby further increasing efficiency of the IGCC system 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
a gas turbine compressor of a gas turbine engine configured to provide a flow of pressurized air to a combustor of the gas turbine engine;
a sulfur recovery unit comprising a thermal reactor configured to receive a flow of acid gas and to convert hydrogen sulfide within the acid gas to elemental sulfur via a Claus process; and
an extraction air line extending between the gas turbine compressor and the sulfur recovery unit, wherein the extraction air line routes a portion of the pressurized air from the gas turbine compressor to the thermal reactor.

2. The system of claim 1, wherein the extraction air line comprises a first line extending to the thermal reactor and a second line extending to an air separation unit.

3. The system of claim 1, wherein the extraction air line comprises an expansion device disposed between the gas turbine compressor and the thermal reactor, and the expansion device is configured to reduce a pressure of air entering the thermal reactor.

4. The system of claim 1, wherein the sulfur recovery unit comprises a heat exchanger configured to transfer heat from at least a portion of the pressurized air extracted from the gas turbine compressor into acid gas flowing into the thermal reactor.

5. The system of claim 1, wherein the sulfur recovery unit comprises a reheater configured to heat exhaust gas from the thermal reactor prior to entering a catalytic reactor, wherein the reheater is configured to transfer heat from at least a portion of the pressurized air extracted from the gas turbine compressor to the exhaust gas from the thermal reactor.

6. The system of claim 1, wherein the sulfur recovery unit comprises:
a blower configured to provide the thermal reactor with an air flow; and
a heat exchanger configured to transfer heat from at least a portion of the pressurized air extracted from the gas turbine compressor to the air flow provided by the blower.

7. The system of claim 1, wherein the pressurized air extracted from the gas turbine compressor is mixed with additional oxygen prior to entering the thermal reactor.

8. The system of claim 7, comprising an air separation unit configured to provide the additional oxygen.

9. The system of claim 7, comprising a blower configured to provide the additional oxygen via an air flow.

10. A system comprising:
a sulfur recovery unit comprising a thermal reactor having an acid gas inlet and an air inlet, wherein the acid gas inlet is configured to receive a flow of acid gas, and the air inlet is configured to receive an air flow of pressurized air extracted from a gas turbine compressor of a gas turbine engine;
an air extraction line coupled to the air inlet and configured to provide the air flow of pressurized air extracted from the gas turbine compressor; and
at least one heat exchanger coupled to the air extraction line upstream from the air inlet.

11. The system of claim 10, wherein the sulfur recovery unit comprises an expansion device coupled to the air extraction line downstream from the at least one heat exchanger, and the expansion device is configured to reduce a pressure of the pressurized air extracted from the gas turbine compressor prior to entry into the thermal reactor.

12. The system of claim 10, wherein the at least one heat exchanger comprises a heat exchanger configured to transfer heat from the pressurized air to the acid gas prior to the acid gas entering the thermal reactor.

13. The system of claim 10, wherein the at least one heat exchanger comprises a reheater configured to transfer heat from the pressurized air to exhaust gas from the thermal reactor prior to the exhaust gas entering a catalytic reactor.

14. The system of claim 10, wherein the at least one heat exchanger comprises a heat exchanger configured to transfer heat from the pressurized air to an additional air flow from a blower to the thermal reactor.

15. A system comprising:
a gas turbine engine comprising a gas turbine compressor;
an air separation unit configured to receive pressurized air extracted from the gas turbine compressor via a conduit extending between the gas turbine compressor and the air separation unit; and
a sulfur recovery unit configured to extract a portion of the pressurized air from the conduit.

16. The system of claim 15, wherein the portion of the pressurized air extracted from the conduit is approximately between 5 to 10 mole percent.

17. The system of claim 15, wherein the sulfur recovery unit comprises a thermal reactor configured to receive the pressurized air extracted from the conduit.

18. The system of claim 17, wherein the sulfur recovery unit comprises a catalytic reactor configured to receive a flow of acid gas from a gas cleaning unit, a flow of exhaust gas from the thermal reactor, or a combination thereof.

19. The system of claim 18, wherein the sulfur recovery unit comprises a first heat exchanger configured to transfer heat from the pressurized air extracted from the conduit to the flow of acid gas from the gas cleaning unit, a second heat exchanger configured to transfer heat from the pressurized air extracted from the conduit to the flow of exhaust gas from the thermal reactor, a third heat exchanger configured to transfer heat from the pressurized air extracted from the conduit to an air flow from a blower into the thermal reactor, or a combination thereof.

* * * * *